(12) United States Patent
Suzuki

(10) Patent No.: US 8,821,735 B2
(45) Date of Patent: Sep. 2, 2014

(54) MANUFACTURING METHOD OF A GLASS SUBSTRATE FOR A MAGNETIC DISK

(75) Inventor: Yosuke Suzuki, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/379,864

(22) PCT Filed: Mar. 31, 2011

(86) PCT No.: PCT/JP2011/058332
§ 371 (c)(1),
(2), (4) Date: Apr. 27, 2012

(87) PCT Pub. No.: WO2011/125902
PCT Pub. Date: Oct. 13, 2011

(65) Prior Publication Data
US 2013/0119015 A1 May 16, 2013

(30) Foreign Application Priority Data
Apr. 1, 2010 (JP) .................................. 2010-085020

(51) Int. Cl.
*G11B 5/84* (2006.01)
*C03C 19/00* (2006.01)

(52) U.S. Cl.
CPC .............. *G11B 5/8412* (2013.01); *C03C 19/00* (2013.01)
USPC .................... 216/22; 216/38; 216/52; 216/53; 216/88; 216/89; 216/96; 216/97; 216/98; 451/41; 451/54; 451/63; 134/1; 134/1.3; 134/6; 134/7

(58) Field of Classification Search
None
See application file for complete search history.

(56) References Cited

U.S. PATENT DOCUMENTS

| | | | | |
|---|---|---|---|---|
| 6,036,785 A | * | 3/2000 | Ferrell | 134/1 |
| 6,124,207 A | * | 9/2000 | Robinson et al. | 438/692 |
| 6,315,644 B1 | * | 11/2001 | Cho et al. | 451/60 |
| 7,918,941 B2 | * | 4/2011 | Tamura et al. | 134/1.3 |
| 8,252,488 B2 | * | 8/2012 | Shiota | 430/5 |
| 8,563,077 B2 | * | 10/2013 | Yamaguchi et al. | 427/129 |
| 2002/0157199 A1 | * | 10/2002 | Piltingsrud | 15/77 |
| 2006/0201532 A1 | * | 9/2006 | Shirazi | 134/1 |
| 2009/0025761 A1 | * | 1/2009 | Matsumoto et al. | 134/133 |
| 2010/0192974 A1 | * | 8/2010 | Matsumoto et al. | 134/1.3 |
| 2011/0151752 A1 | * | 6/2011 | Ono et al. | 451/41 |
| 2012/0251711 A1 | * | 10/2012 | Sakai et al. | 427/128 |
| 2013/0146085 A1 | * | 6/2013 | Kou | 134/1 |
| 2013/0239987 A1 | * | 9/2013 | Kou | 134/1 |

FOREIGN PATENT DOCUMENTS

| | | |
|---|---|---|
| JP | 7-153074 A | 6/1995 |
| JP | 11-043791 A | 2/1999 |
| JP | 2004-335081 A | 11/2004 |
| JP | 2007-179612 A | 7/2007 |

* cited by examiner

*Primary Examiner* — Anita Alanko
(74) *Attorney, Agent, or Firm* — Sughrue Mion, PLLC

(57) ABSTRACT

An object of the invention is to effectively remove particles on the glass substrate surfaces, even in the case wherein abrasive particles having a small particle size is used in the polishing step of the glass substrate and a supersonic treatment is performed at a high frequency at the supersonic cleaning step after the polishing step. In a manufacturing method of a glass substrate for a magnetic disk comprising a polishing step for performing polishing of the glass substrate and a supersonic cleaning step for performing supersonic cleaning of the glass substrate after the polishing step, the polishing step uses abrasive particles having a particle size of 10 nm to 30 nm and a first supersonic cleaning is performed at a frequency of 300 kHz to 1,000 kHz to form secondary particles and then a second supersonic cleaning is performed at a frequency of 30 kHz to 100 kHz in the supersonic cleaning step.

19 Claims, No Drawings

MANUFACTURING METHOD OF A GLASS SUBSTRATE FOR A MAGNETIC DISK

CROSS REFERENCE TO RELATED APPLICATIONS

This application is a National Stage of International Application No. PCT/JP2011/058332 filed Mar. 31, 2011, claiming priority based on Japanese Patent Application No. 2010-085020, filed Apr. 1, 2010, the contents of all of which are incorporated herein by reference in their entirety.

TECHNICAL FIELD

The present invention relates to a manufacturing method of a glass substrate for a magnetic disk.

BACKGROUND ART

With advancement of information technology, information recording technology, particularly magnetic recording technology, has progressed remarkably. In a magnetic disk used for an HDD (hard disk drive) which is one of the magnetic recording media and so on, rapid miniaturization, production of thinner disk, increase in recording density and speedup of access rate have been continued. The HDD performs recording and playbacking while allowing a magnetic disk having a magnetic layer on a discal substrate to rotate at a high rate and allowing a magnetic head to fly floating above this magnetic disk.

Higher substrate strength is demanded for a magnetic disk since the rotary rate of the magnetic disk increases with the increase of access rate. In addition, with the increase of recording density, the magnetic head changes from a thin film head to a magnetoresistive head (MR head), further to a giant magnetoresistive head (GMR head), and further with the introduction of DFH (Dynamic Flying Height) control mechanism, the flying height from the magnetic disk of the magnetic head (the narrowest distance among the gaps between the magnetic head and the magnetic disk) becomes narrower to around 2 nm. On this account, when there are irregularities on the magnetic disk surfaces, there may be caused crash failure due to collision of the magnetic head, thermal asperity failure which leads to read errors due to heat caused by adiabatic compression of the air or contact thereof. It becomes important to finish the main surfaces of the magnetic disk as an extremely smooth surface to suppress such troubles caused on the magnetic head.

Therefore, glass substrates have come to be used lately as substrates for a magnetic disk in place of conventional aluminum substrates. This is because the glass substrates consisting of glass, which is a rigid material, can be superior to the aluminum substrates consisting of a metal, which is a flexible material, in smoothness of the substrate surfaces. In addition, since the glass substrate is harder than the aluminum substrate, distortion and flapping of the substrate at the time of high-speed rotation can be suppressed. Thereby, collision risk against the head can be reduced.

In the meantime, the flying height of the head also decreases with the improvement of the recording density when the glass substrate is used, and therefore surface smoothing of the glass substrate for magnetic disks and the removal of particles (contamination) become still more important. Since magnetic particles are divided respectively in the next generation bit-patterned media and discrete track media in particular, it is expected that presence of fine irregularities on the glass substrate surfaces and fine particles adhering to the glass substrate surfaces become serious. Therefore, a polishing step and a supersonic treatment step are performed on the glass substrate to improve smoothing of the glass substrate and to remove particles on the glass substrate surfaces (for example, refer to Patent Document 1).

CITATION LIST

Patent Literature

[Patent Literature 1] Japanese Patent Laid-Open No. 2004-335081

SUMMARY OF INVENTION

Technical Problem

In late years, the particle size of the abrasive particles used for polishing of the glass substrate is in the course of reduction to improve smoothing of the glass substrate surfaces. On the other hand, it is in a situation that the extremely fine convex shape is not permitted on the magnetic disk surface to realize further reduction of the flying height. Therefore, removal of fine abrasive particles used for polishing of the glass substrate is becoming an important problem to be solved. In the meantime, it is necessary to increase frequency in the supersonic cleaning step performed after the polishing step for the purpose of removing particles on the glass substrate surfaces as the particle size to be cleaned decreases since the frequency band to apply is determined for the target particle size. For example, supersonic cleaning at 50 kHz is carried out after performing polishing with abrasive particles of 0.8 μm in Patent Document 1. Therefore, it is considered to be necessary to set a higher supersonic frequency when the abrasive particles are smaller than this.

However, it has been revealed that abrasive particles cannot be removed enough when the supersonic wave frequency increases. The reason thereof is presumed that when the supersonic wave frequency increases, movement of fine particles other than the target particle size to be cleaned becomes active, and these particles collides to aggregate into large particles. For example, it has been found that particles of a particle size around 20 nm are not removed but aggregated by irradiating a supersonic wave of relatively high frequency (120 to 950 kHz). On the other hand, there is a problem that particles of a particle size of 20 nm cannot be removed even by irradiating a supersonic wave of a relatively low frequency (for example, 80 kHz).

In late years an HDD equipped with a DFH (Dynamic Flying Height) technique in the head has been developed to improve recording density still more. This technology enables to bring the head element part closer to the media surfaces than before so that magnetic spacing may be reduced, but in the meantime, it has been revealed that it is necessary to make smoother and cleaner the main surfaces of the magnetic disks having less defects such as contaminating substances more than before when the DFH head is used. This is considered to be because the head element part is affected even by disorder with a little surface irregularities or even by contact with contaminating substances since the DFH head does not decrease the flying height of the main body of the head so that the main body can approach the magnetic disk surface but pushes out only the region around the head element part so that the latter can approach the media surface. For example, in order to achieve recording density of more than 500 GB per one piece of 2.5-inch magnetic disk, it is demanded to make the gap between the pushed-out head element part and the magnetic disk preferably not more than 1 nm.

The present invention has been accomplished in the light of the problems mentioned above, and an object thereof is to effectively remove particles on the glass substrate surfaces, even in the case wherein abrasive particles having a small particle size are used in the polishing step of the glass substrate and a supersonic treatment is performed at a high frequency at the supersonic cleaning step after the polishing step.

Solution to the Problems

The manufacturing method of a glass substrate for a magnetic disk of the present invention is characterized in that the process comprises a polishing step for performing polishing of the glass substrate with abrasive particles having a specified particle size and a supersonic cleaning step for performing supersonic cleaning of the glass substrate after the polishing step and that the supersonic cleaning step comprises performing a first supersonic cleaning at a frequency to aggregate particles having the specified particle size to form secondary particles and then performing a second supersonic cleaning at a frequency to clean the secondary particles as the cleaning target.

The manufacturing method of a glass substrate for a magnetic disk of the present invention is characterized in that the process comprises a polishing step for performing polishing of the glass substrate and a supersonic cleaning step for performing supersonic cleaning of the glass substrate after the polishing step and that the polishing step uses abrasive particles having a particle size of 10 nm to 30 nm and a first supersonic cleaning is performed at a frequency of 300 kHz to 1,000 kHz to form secondary particles and then a second supersonic cleaning is performed at a frequency of 30 kHz to 100 kHz in the supersonic cleaning step.

In the manufacturing method of a glass substrate for a magnetic disk of the present invention, it is preferable that the secondary particles having a particle size of 1,000 nm to 3,000 nm are formed by performing the first supersonic cleaning.

In the manufacturing method of a glass substrate for a magnetic disk of the present invention, it is preferable that the said polishing step is the final polishing step among polishing steps which are performed several times for the glass substrate.

Technical Advantage of the Invention

Even when abrasive particles having a small particle size are used in the polishing step, aggregated particles derived from abrasive particles and so on are prevented from remaining and particles on the glass substrate surfaces can be removed effectively in the supersonic cleaning step for the glass substrate after performing the polishing step by performing a first supersonic cleaning at a relatively high frequency and then performing a second supersonic cleaning at a relatively low frequency.

DESCRIPTION OF THE EMBODIMENTS

When the present inventor reduced the particle size of the abrasive particles to use in the polishing step for the purpose of improving smoothing of the glass substrate surfaces still more and performed a supersonic cleaning using a relatively high frequency in the supersonic cleaning step after polishing for the purpose of removing fine particles, the present inventor faced a problem that particles (particle size: 10 nm to 30 nm) derived from the abrasive particles which had not caused a problem before aggregated and remained on the glass substrate surfaces.

That is, it became understood that contaminating substances remained on the glass substrate surfaces even if the supersonic wave frequency was increased along with size reduction of the abrasive particles. These contaminating substances were analyzed and found to be aggregated fine abrasive particles. It is considered from this that abrasive particles aggregated and grew larger with contaminating substances as cores under irradiation of a high frequency supersonic wave, and thus the high frequency originally used became inappropriate for cleaning and removing.

On this account, the present inventor conducted intensive studies in order to solve this problem and as a result, the inventor has found that particles on the glass substrate surfaces can be removed effectively and besides concave defects which may be resulted by the supersonic wave are not caused by irradiating a supersonic wave at a relatively high frequency (not less than 300 kHz and not more than 1,000 kHz) in the supersonic cleaning step to perform after the polishing step thereby aggregating particles caused by abrasive particles and then irradiating a supersonic wave while changing to a supersonic wave having a relatively low frequency (not less than 30 kHz and not more than 100 kHz). In the following, the manufacturing method of a glass substrate for a magnetic disk of the present invention is described specifically.

The manufacturing method of a glass substrate for a magnetic disk shown in the present embodiment comprises a polishing step for performing polishing of the glass substrate at least using abrasive particles having a specified particle size and a supersonic cleaning step for performing supersonic cleaning of the glass substrate after the polishing step, wherein the supersonic cleaning step comprises performing a first supersonic cleaning at a frequency to aggregate particles having the specified particle size to form secondary particles and then performing a second supersonic cleaning at a frequency to clean the secondary particles as target particles and not to cause concave defects on the glass substrate surfaces. For example, when abrasive particles having a particle size of 10 nm to 30 nm are used in the polishing step, the first supersonic cleaning is performed at a frequency of 300 kHz to 1,000 kHz and the second supersonic cleaning is performed at a frequency of 30 kHz to 100 kHz.

In the supersonic cleaning step mentioned above, the purpose of the first supersonic cleaning using a relatively high frequency (300 kHz to 1,000 kHz) is to remove the particles having a particle size which falls under the target of cleaning and to aggregate particles (abrasive particles and so on) having a particle size of 10 nm to 30 nm which does not fall under the target of cleaning so that secondary particles (aggregates) may be formed; and the purpose of the second supersonic treatment using a relatively low frequency (30 kHz to 100 kHz) is to remove the secondary particles aggregated by the first supersonic treatment without causing concave defects on the glass substrate.

That is, at first particles adhering to the glass substrate surfaces and having a particle size which falls under the object to be cleaned are removed by performing a supersonic treatment at a relatively high frequency and particles which are not the object of cleaning are made collided to larger particles so that they may be aggregated. Afterwards, the aggregated particles having a larger particle size are removed by performing a supersonic treatment at a relatively low frequency. In this case, most of the once aggregated particles can be removed without making them into a dispersion state even if a supersonic treatment at a relatively low frequency is performed. This is considered to be because organic matters exist in the interface of the aggregates and the binding power therebetween becomes strong.

These organic matters are considered to come from a dispersant and a re-aggregation inhibitor added to the slurry with the size reduction of the abrasive particles. As the dispersant and the re-aggregation inhibitor are added so that the selected materials thereof may be optimal for the pH of the slurry, a dispersant showing an effect in an acidic slurry, for example, cannot show a sufficient dispersing effect under an alkaline condition.

The frequency of the first supersonic cleaning may be set to a frequency which enables to remove particles adhering to the glass substrate surfaces and having a particle size which falls under the target of cleaning and aggregate particles which do not the target of cleaning (here, particles such as abrasive particles of 10 nm to 30 nm). For example, the frequency meeting such a condition may be 300 kHz to 1,000 kHz. When the frequency is less than 300 kHz, particles having a particle size of 10 nm to 30 nm do not smoothly form second particle size and when the frequency exceeds 1,000 kHz, tertiary particles, quaternary particles, etc. are formed, which become difficult to remove.

The frequency of the second supersonic cleaning may be set to a frequency whose cleaning target is the particle size of the particles aggregated and generated by the frequency of the first supersonic cleaning. For example, the particle size of the aggregated particles when the frequency of the first supersonic cleaning is set to 950 kHz is 1,000 nm to 3,000 nm although it varies depending on the duration time for applying the supersonic wave, and thus the frequency of the second supersonic cleaning may be set to 30 kHz to 100 kHz so that the target particle size is 1,000 nm to 3,000 nm. Incidentally, the frequency of the supersonic cleaning and the particle size of the particles which falls under the target of cleaning can be obtained by the following expression (1) which shows the relation between the supersonic wave frequency band and the cleaning target size using the amplitude and speed of sound:

$$\delta_{ac} = (2v/\omega)^{0.5} \text{(in water)} \quad (1)$$

Here, in the expression (1) mentioned above, $\delta_{ac}$ represents the thickness of the acoustic pressure boundary layer, $v$ represents the speed of sound, and $\omega$ represents the Hz (frequency).

When the frequency of the second supersonic cleaning is less than 30 kHz, particles are removed but the glass surfaces are exposed to strong impact and the surface roughness may be deteriorated and it becomes difficult to remove particles when the frequency exceeds 100 kHz.

The first supersonic cleaning and the second supersonic cleaning can be performed separately in two different cleaning tanks or can be performed consecutively by changing frequencies in a single cleaning tank. As for the timing to change from the frequency of the first supersonic cleaning to the frequency of the second supersonic cleaning, it is preferable to measure the time and the like for which the secondary particles are formed by irradiation at a frequency to be used in the first supersonic cleaning beforehand and feed back the condition. This enables to perform the second supersonic cleaning after sufficiently forming secondary particles having a particle size to be the target of the second supersonic cleaning by the first supersonic cleaning.

Supersonic cleanings at different frequencies are formed on the polished glass substrate successively in this way and the secondary particles are formed by aggregating particles caused by abrasive particles, and then the said secondary particles are removed and thereby particles on the glass substrate surfaces can be effectively removed even if fine abrasive particles (particle size: 10 nm to 30 nm) are used at the polishing step and the supersonic treatment is performed at a relatively high frequency (300 kHz to 1,000 kHz) at the supersonic cleaning step after the polishing step.

Both the first supersonic cleaning and the second supersonic cleaning are preferably performed in liquids adjusted to be alkaline. According to the investigation by the present inventor, it is difficult to aggregate fine abrasive particles to form secondary particles in an acid condition. Here, when the first supersonic cleaning is performed in an alkaline condition and the second supersonic cleaning is performed in an acidic condition, the secondary particles generated by the first supersonic cleaning are decomposed at the time of the second supersonic cleaning and therefore, particles are not removed well as compared with the case wherein the cleaning liquids for the first supersonic cleaning and the second supersonic cleaning are adjusted to be alkaline. Preferably, the pH of the cleaning liquid for the first supersonic cleaning and the second supersonic cleaning is in a range of pH 12 to 14, more preferably in a range of pH 13 to 14. Of course it is preferable to adjust such a range that the surface roughness of the substrate may not be deteriorated.

The manufacturing method of a glass substrate for a magnetic disk of the present embodiment can be considered as including a combination process of an aggregation treatment for forming secondary particles by aggregating abrasive particles adhering to the surface of the glass substrate and a cleaning treatment for removing the said secondary particles. Specifically, after the polishing treatment for polishing the surface of the glass substrate by utilizing a slurry containing abrasive particles is performed, the abrasive particles adhering to the surface of the glass substrate are aggregated to form secondary particles (aggregation treatment) and then the secondary particles are removed by cleaning (cleaning treatment).

The aggregation treatment may be a treatment performed by applying a supersonic wave on the above abrasive particles in an alkaline adjusted liquid. Scrub cleaning etc. can be used as the cleaning treatment but it is preferable to use supersonic cleaning.

As for the polishing step, it is preferable that the slurry contains abrasive particles of silicon oxide. Silicon oxide particles can be obtained as abrasive particles having an extremely fine core particle size of 10 to 30 nm in a relatively uniform particle size and they have the same main ingredient as the glass substrate and a small difference in hardness from the glass substrate to be polished, and therefore they are most suitable for extremely smoothly polishing the glass substrate surfaces.

It is preferable that the polishing step uses a slurry containing abrasive particles of silicon oxide in an acidic condition. Etching effect by an acid and so on enables to improve the polishing rate.

In the following, steps of the manufacturing method of a substrate for a magnetic disk having a supersonic cleaning step stated above are described in detail. It should be noted that the order of the respective steps is not limited to that described below and may be appropriately exchanged.

(1) Material Processing Step

Sheet glass can be used in the material processing step. As for the glass, aluminosilicate glass, soda-lime glass, borosilicate glass, etc. can be used. In particular, it is preferable to use aluminosilicate glass at the point that a glass substrate for a magnetic disk excellent in smoothness and substrate strength of the main surface can be provided. The sheet glass can be produced, for example, by well-known manufacturing method such as press method and float process, down-draw method, redraw method and fusion method using these glasses as a material. Among these methods, use of press method allows low cost production of sheet glass.

(2) First Grinding (Lapping) Step

In the first lapping step, the main surfaces of the discal glass substrate are subjected to lapping to adjust the shape of the glass substrate.

The first lapping step can be carried out using a double-sided lapping machine employing a planetary gear mechanism with the use of alumina-based free abrasive particles. Specifically, the lapping is carried out by pressing lapping surface plates onto the both surfaces of the discal glass substrate from both the upper and lower sides, supplying a grinding fluid containing the free abrasive particles onto the main surfaces of the discal glass substrate, and relatively moving them to each other. By this lapping, the glass substrate having smooth main surfaces can be obtained.

(3) Cutting-Out Step (Coring Step for Forming an Opening Part, Chamfering Step for Forming Chamfering Sides in the Edge Parts (Outer and Inner Peripheral Edge Parts) (Chamfering Surface Forming Step)

In the coring step, an inner opening is formed at the center part of the discal glass substrate, for example, with a cylindrical diamond drill, thereby obtaining an annular glass substrate. In the chamfering step, grinding is applied to the outer peripheral edge face and inner peripheral edge face using diamond grindstones, thereby carrying out predetermined chamfering processing in the glass substrate.

(4) Second Lapping Step

The second lapping was applied to both the main surfaces of the obtained glass substrate in the second lapping step. By performing the second lapping step, fine irregularities formed on the main surfaces of the glass substrate in the cutting-out step as a previous step can be removed and it is enabled to complete a subsequent main surface polishing step in a short time.

The second lapping step can be carried out using a double-sided lapping machine employing a planetary gear mechanism with the use of a fixed abrasive particle pad consisting of diamond sheets. The diamond sheet may keep diamond particles as grinding abrasive particles and, for example, a diamond sheet having a base material made of PET provided with diamond particles can be used.

(5) Edge Face Polishing Step

In the edge face polishing step, the outer peripheral edge face and inner peripheral edge face of the glass substrate are mirror-polished by a brush polishing method. For this purpose, as polishing abrasive particles, a slurry containing cerium oxide abrasive particles can be used. By this edge face polishing step, the edge faces of the glass substrate are finished to a mirror surface state.

(6) Main Surface Polishing Step (First Polishing Step)

The first polishing step is first carried out as a main surface polishing step. The first polishing step mainly aims to remove cracks or strains remaining on both the main surfaces during the foregoing lapping steps. In this first polishing step, both the main surfaces are polished with a double-sided polishing machine having a planetary gear mechanism along with the use of a hard resin polisher. Cerium oxide abrasive particles may be used as a polishing agent. It is preferable that the glass substrate subjected to the first polishing step is washed with a neutral detergent, pure water, IPA, etc.

As the double-sided polishing machine, a pair of abrasive cloths (abrasive pad of a hard resin polisher) may be attached to the main surfaces of the surface plate on the upper and lower sides and used.

In this double-sided polishing machine, a glass substrate may be provided between the abrasive cloths attached to the surface plate on the upper and lower sides and one or the both surface plates on the upper and lower sides is/are moved to polish both the main surfaces of the glass substrate.

(7) Chemical Strength Step

In the chemical strength step, a chemical strength treatment is performed by dipping the glass substrate in a chemical strength liquid. As a chemical strength liquid used for the chemical strength treatment, for example, a mixed solution of potassium nitrate (60%) and sodium nitrate (40%) can be used. The chemical strength treatment is performed by heating the chemical strength liquid to 300° C. to 400° C. and preheating the glass substrate to 200° C. to 300° C. and dipping the substrate in the chemical strength solution for three hours to four hours. It is preferable that this dipping is performed in a state that plural glass substrates are held at the edge faces in a holder so that the both of the entire surfaces of the glass substrates are chemically strengthened.

Lithium and sodium ions in the surface layer of the glass substrates are respectively substituted with sodium and potassium ions having relatively larger radii in the chemical strength solution by performing a dipping treatment in the chemical strength solution in this way, thereby the glass substrates are strengthened. The chemically strengthened glass substrates may be washed with pure water, IPA or the like after washed with sulfuric acid.

(8) Main Surface Polishing Step (Final Polishing Step)

The second polishing step is carried out as a final polishing step. The second polishing step is a step aiming to finish both the main surfaces to mirror-like surfaces. In the second polishing step, both the main surfaces are mirror-polished with a double-sided polishing machine having a planetary gear mechanism along with the use of a soft foaming resin polisher. Colloidal silica or the like having a particle size of 10 nm to 30 nm finer than the cerium oxide abrasive particles used in the first polishing step may be used as a slurry. A double-sided polishing machine employing a planetary gear mechanism can be used in this final polishing step like in the above first polishing step.

(9) Supersonic Cleaning Step

A cleaning step using supersonic waves is performed to the glass substrate after the final polishing step. The supersonic cleaning step is a step aiming to remove the particles adhering to the surfaces of the glass substrate after the final polishing step using two or more kinds of supersonic wave frequency bands.

In the supersonic cleaning step, supersonic waves are irradiated after the glass substrate having been subjected to final polishing step is dipped into pure water, a KOH aqueous solution or the like. Specifically, the first supersonic cleaning at a relatively high frequency (300 kHz to 1,000 kHz) is performed to form secondary particles at first and then successively the second supersonic cleaning at a relatively low frequency (30 kHz to 100 kHz) is performed, thereby removing particles containing the secondary particles aggregated by the first supersonic cleaning from the glass substrate surfaces.

The first supersonic cleaning and the second supersonic cleaning can be performed by changing the frequencies in a single supersonic cleaning step. As for the timing to change from the frequency of the first supersonic cleaning to the frequency of the second supersonic cleaning, it is preferable to define the relation between the supersonic cleaning duration time and the size of the particles formed by the irradiation at a relatively high frequency (for example, 1,000 nm to 3,000 nm) and the like beforehand and feed back the condition. This enables to perform the second supersonic cleaning after sufficiently forming secondary particles by the first supersonic cleaning.

<Step for Producing Magnetic Disks (Recording Layer and the Like Forming Step)>

Perpendicular magnetic recording disks can be produced by film-forming, for example, an adhesion layer, a soft magnetic layer, a nonmagnetic underlayer, a perpendicular magnetic recording layer, a protective layer and a lubricating layer sequentially on the main surfaces of the glass substrate obtained through the foregoing steps. Cr alloys and so on can be mentioned as materials constituting the adhesion layer. CoTaZr group alloys and so on can be mentioned as materials constituting the soft magnetic layer. A granular nonmagnetic layer and so on can be mentioned as the nonmagnetic underlayer. A granular magnetic layer and so on can be mentioned as the perpendicular magnetic recording layer. Hydrogenated carbons and so on can be mentioned as materials constituting the protective layer. Fluorine resins and so on can be mentioned as materials constituting the lubrication layer. For example, these recording layers and the like can be formed more specifically by film-forming an adhesion layer of CrTi, a soft magnetic layer of CoTaZr/Ru/CoTaZr, a nonmagnetic granular underlayer of $CoCrSiO_2$, a granular magnetic layer of $CoCrPt$—$SiO_2.TiO_2$ and a hydrogenated carbon protective layer sequentially with an in-line type sputtering apparatus and then film-forming a perfluoropolyether lubricating layer by dipping method on the glass substrate. Here, a Ru underlayer may be used in substitution for the nonmagnetic granular underlayer of $CoCrSiO_2$. In addition, a seed layer of NiW may be added between the soft magnetic layer and the underlayer. A magnetic layer of CoCrPtB may be also added between the granular magnetic layer and the protective layer.

Next, Examples and Comparative Examples performed for making clear the effects of the present invention are described.

Size and number of the particles which remained on the glass substrate surfaces were evaluated after performing a supersonic cleaning step for the glass substrate which has been subjected to the first polishing step and the second polishing step (final polishing step).

For the glass substrate, use was made of an aluminosilicate glass which contains, as main components, $SiO_2$: 58 wt % to 75 wt %, $Al_2O_3$: 5 wt % to 23 wt %, $Li_2O$: 3 wt % to 10 wt % and $Na_2O$: 4 wt % to 13 wt %. Here, $Li_2O$ may be not less than 0 wt % and not more than 7 wt %.

<Main Surface Polishing Step (First Polishing Step)>

The first polishing step was first carried out as a main surface polishing step. In the first polishing step, the main surfaces were polished with a double-sided polishing machine having a planetary gear mechanism along with the use of a hard resin polisher. A slurry containing cerium oxide having a particle size of 0.2 nm to 4.5 nm was used as a polishing agent.

The glass substrate subjected to the first polishing step was washed by dipping the substrate sequentially in cleaning tanks respectively of a neutral detergent, pure water and IPA (isopropyl alcohol).

<Main Surface Polishing Step (Final Polishing Step)>

Next, the second polishing step was carried out as a main surface polishing step. This second polishing step aims to finish the main surfaces to mirror-like surfaces. In the second polishing step, the main surfaces are mirror-polished with a double-sided polishing machine having a planetary gear mechanism along with the use of a soft foaming resin polisher. A slurry containing colloidal silica abrasive particles (average particle size 10 nm to 30 nm) finer than the cerium oxide abrasive particles used in the first polishing step were used as a polishing agent.

Here, in Examples and Comparative Examples, the pH of the slurry mentioned above set to 2 and used for polishing. At this time, an additive containing acetic acid and an acetate salt was added to the slurry mentioned above then the mixture was used for polishing. This is to control the pH of the slurry constantly all over the polishing step. For the slurry (polishing liquid) mentioned above, a mixture in which the colloidal silica particles mentioned above were added to ultrapure water is used with 0.5 wt % of citric acid added thereto as an additive.

<Supersonic Cleaning Step>

Glass substrates subjected to the final polishing step were dipped in a KOH aqueous solution of 2 wt % in concentration and supersonic cleaning step was performed under respective conditions shown in Table 1. Then, after the substrates were washed by dipping in respective cleaning tanks of a neutral detergent, pure water, pure water, IPA, IPA (steam drying) sequentially, the number of particles which remained on the glass substrate surfaces and the occurrence of cracks on the substrate surfaces were evaluated using the optical measuring instrument.

(Results of Evaluation)

The results of evaluation are shown in Table 1.

TABLE 1

| | Particle size of abrasive particles at the final polishing step | Frequency of the first supersonic treatment (kHz) | Duration time of the first supersonic treatment (s) | Frequency of the second supersonic treatment (kHz) | Duration time of the second supersonic treatment (s) | Number of remaining particles | Occurrence of cracks | DFH touchdown test |
|---|---|---|---|---|---|---|---|---|
| Example 1 | 10 | 300 | 330 | 30 | 220 | 1200 | None | ○ |
| Example 2 | 10 | 300 | 330 | 100 | 220 | 1050 | None | ○ |
| Example 3 | 10 | 600 | 330 | 40 | 220 | 770 | None | ○ |
| Example 4 | 10 | 950 | 330 | 30 | 220 | 10 | None | ○ |
| Example 5 | 10 | 950 | 330 | 100 | 220 | 13 | None | ○ |
| Example 6 | 30 | 300 | 330 | 30 | 220 | 1000 | None | ○ |
| Example 7 | 30 | 300 | 330 | 100 | 220 | 800 | None | ○ |
| Example 8 | 30 | 600 | 330 | 40 | 220 | 600 | None | ○ |
| Example 9 | 30 | 950 | 330 | 30 | 220 | 16 | None | ○ |
| Example 10 | 30 | 950 | 330 | 100 | 220 | 2 | None | ○ |
| Example 11 | 20 | 200 | 330 | 40 | 220 | 3500 | None | △ |
| Example 12 | 20 | 2000 | 330 | 40 | 220 | 10000 | None | △ |
| Example 13 | 20 | 600 | 330 | 28 | 220 | 700 | 発生 | △ |

TABLE 1-continued

|  | Particle size of abrasive particles at the final polishing step | Frequency of the first supersonic treatment (kHz) | Duration time of the first supersonic treatment (s) | Frequency of the second supersonic treatment (kHz) | Duration time of the second supersonic treatment (s) | Number of remaining particles | Occurrence of cracks | DFH touchdown test |
|---|---|---|---|---|---|---|---|---|
| Example 14 | 20 | 600 | 330 | 150 | 220 | 4000 | None | Δ |
| Example 15 | 20 | 50 | 330 | 300 | 220 | 11000 | None | Δ |
| Example 16 | 20 | 100 | 330 | 2000 | 220 | 11000 | None | Δ |
| Example 17 | 20 | 600 | 330 | 40 | 220 | 650 | None | ○ |
| Example 18 | 20 | 950 | 330 | 30 | 220 | 12 | None | ○ |
| Example 19 | 20 | 950 | 330 | 100 | 220 | 5 | None | ○ |
| Example 20 | 5 | 950 | 330 | 100 | 220 | 25 | None | ○ |
| Example 21 | 40 | 950 | 330 | 100 | 220 | 20 | None | ○ |
| Comparative Example 1 | 20 | 50 | 550 | — | 0 | 9000 | None | Δ |
| Comparative Example 2 | 20 | 2000 | 550 | — | 0 | 12000 | None | Δ |
| Comparative Example 3 | 20 | 950 | 550 | — | 0 | 10000 | None | Δ |
| Comparative Example 4 | 20 | — | 0 | 100 | 550 | 9500 | None | Δ |

From Table 1, when a treatment was performed with the frequency of the first supersonic treatment in a range of 300 kHz to 1,000 kHz and the frequency of the second supersonic treatment in a range of 30 kHz to 100 kHz, occurrence of cracks on the glass substrates was suppressed and the number of the remaining particles was able to be reduced (Examples 1 to 10, Examples 17 to 21). This is considered to be because particles caused by abrasive particles are effectively aggregated by performing the first supersonic treatment in a range of frequency of 300 kHz to 1,000 kHz and aggregated particles of the glass substrate surfaces were able to be removed effectively by performing the second supersonic treatment in a range of frequency of 30 kHz to 100 kHz afterwards. In addition, it is considered that the impact imposed on the glass substrates is reduced by making the frequency of the second supersonic treatment in a range of 30 kHz to 100 kHz, and thereby cracks did not occur.

Particularly, the number of the remaining particles was able to be reduced more effectively by increasing the frequency of the first supersonic treatment (950 kHz) (refer to Examples 4, 5, 9, 10, 18-21). This is considered to be because the aggregation of the particles caused by abrasive particles proceeded effectively by increasing the frequency of the first supersonic treatment.

On the other hand, when the treatment was performed only with the frequency of the first supersonic treatment (Comparative Examples 1-3) or the frequency of the second supersonic treatment (Comparative Example 4), the number of the remaining particles significantly increased as compared with working examples.

In addition, even if the first supersonic treatment was performed at a frequency in the range of 300 kHz to 1,000 kHz, when the frequency of the second supersonic treatment was out of the range of 30 kHz to 100 kHz, increase of the number of the remaining particles and the occurrence of cracks were observed as compared with working examples.

Likewise, even if the second supersonic treatment was performed at a frequency in the range of 30 kHz to 100 kHz, when the frequency of the first supersonic treatment was out of the range of 300 kHz to 1,000 kHz, increase of the number of the remaining particles was observed as compared with working examples. This is considered to be because particles caused by abrasive particles were not able to be aggregated by the first supersonic treatment.

Next, results of evaluation when the first supersonic treatment and the second supersonic treatment were performed using different cleaning liquid are shown in Table 2.

TABLE 2

|  | Final polishing step | | | First supersonic treatment | | | Second supersonic treatment | | | Number of remaining particles | Occurrence of cracks |
|---|---|---|---|---|---|---|---|---|---|---|---|
|  | Type of abrasive particles | Particle size [nm] | pH | Frequency [kHz] | Treatment time [sec] | pH | Frequency [kHz] | Treatment time [sec] | | | |
| Example 22 | Colloidal silica | 20 | 13 | 950 | 300 | 13 | 100 | 300 | 3 | None |
| Example 23 |  |  | 7 |  |  |  |  |  | Not less than 100 | None |
| Example 24 |  |  | 1 |  |  |  |  |  | Not less than 100 | None |
| Example 25 |  |  | 13 |  |  | 7 |  |  | Not less than 100 | None |
| Example 26 |  |  |  |  |  | 1 |  |  | Not less than 100 | None |

In addition, even if the particle size of the abrasive particles in the final polishing step was out of the range of 10 nm to 30 nm (for example, 5 nm, 40 nm), when the treatment was performed with the frequency of the first supersonic treatment in a range of 300 kHz to 1,000 kHz and the frequency of the second supersonic treatment in a range of 30 kHz to 100 kHz, occurrence of cracks on the glass substrates was suppressed and the number of the remaining particles was able to be reduced (Examples 20, 21).

From Table 2, when a treatment was performed with the frequency of the first supersonic treatment in a range of 300 kHz to 1,000 kHz and the frequency of the second supersonic treatment in a range of 30 kHz to 100 kHz, the number of the particles was suppressed to not more than 1000 even when different treatment solutions were used.

Particularly, the number of the remaining particles decreased most when the cleaning liquids of the first supersonic treatment and the second supersonic treatment were alkaline (Example 22). In addition, the pH of the cleaning liquid is preferably in a range of 12 to 14, more preferably in a range of 13 to 14.

(DFH Touchdown Test)

Then, magnetic disks were prepared using a glass substrate subjected to the cleaning step under the condition shown in Table 1 mentioned above and a touchdown test of DFH head element part was performed using an HDF tester (Head/Disk Flyability Tester) manufactured by Kubota Comps Corporation. This test slowly pushes out the element part by DFH mechanism and evaluates the distance when the head element part contacts with the magnetic disk surface by detecting the contact with the magnetic disk surface by way of an AE sensor. The head used was a DFH head for 320 GB/P magnetic disks (2.5 inch size). The flying height when the element part is not pushed out is 10 nm. The other conditions were set as follows.

Magnetic disk: 2.5-inch glass substrates (20 mm in inner diameter, 65 mm in outer diameter, 0.8 mm in board thickness) were produced and a recording layer and the like were film-formed on the glass substrates.

Evaluation radius: 22 mm

Number of revolutions of the magnetic disk: 5400 RPM

Temperature: 25° C.

Humidity: 60%

The film formation of the recording layer on the glass substrate was performed as follows. At first, the film formation apparatus was drawn to vacuum, and adhesion layer/soft magnetic layer/pre-underlayer/underlayer/main recording layer/auxiliary recording layer/protective layer/lubrication layer were sequentially film-formed on the substrate in an Ar atmosphere by DC magnetron sputtering method. The Ar gas-pressure at the time of the film formation was 0.6 Pa unless otherwise indicated. As the adhesion layer, Cr-50Ti was film-formed to 10 nm. As the soft magnetic layer, 92Co-3Ta-5Zr was film-formed respectively to 20 nm sandwiching a 0.7-nm Ru layer. As the pre-underlayer, Ni-5 W was film-formed to 8 nm. As the underlayer, Ru was film-formed to 10 nm at 0.6 Pa and Ru was film-formed to 10 nm at 5 Pa thereon. As the main recording layer, 90 (72Co-10Cr-18Pt)-5 ($SiO_2$)-5 ($TiO_2$) was film-formed to 15 nm at 3 Pa. As the auxiliary recording layer, 62Co-18Cr-15Pt-5B was film-formed to 6 nm. As the protective layer, $C_2H_4$ was film-formed to 4 nm by CVD method and the surface layer was subjected to nitriding treatment. As the lubrication layer, PFPE was formed to 1 nm by a dip coating method.

Results of the DFH touchdown test are shown in Table 1. Here in Table 1, evaluation was made as follows depending on the distance (assuming this as x) at which the head element part and the magnetic disk contacted.

◯: $x \leq 1.0$ nm

Δ: $1.0$ nm$<x$

From the results of the DFH touchdown test in Table 1, in the case wherein the substrates which successfully suppressed the occurrence of cracks and reduce the number of the remaining particles effectively were used (Examples 1 to 10, Examples 17 to 21), the distance at which the head element part and the magnetic disk contacted was able to be reduced to as low as not more than 1.0 nm.

As shown above, it is considered that when a treatment was performed with the frequency of the first supersonic treatment in a range of 300 kHz to 1,000 kHz and the frequency of the second supersonic treatment in a range of 30 kHz to 100 kHz, particles on the glass substrate surfaces can be removed effectively without causing concave defects resulted by the supersonic wave.

Materials, size, treatment procedure, inspection procedure in the embodiments mentioned above are examples and the invention can be carried out with various modifications within the scope in which the effects of the present invention are exhibited. In addition, the invention can be carried out with appropriate modifications as long as they do not deviate from the scope of objects of the present invention.

The present application is based on Japanese Patent Application No. 2010-085020. The contents thereof are entirely incorporated herein.

The invention claimed is:

1. A manufacturing method of a glass substrate for a magnetic disk comprising:
    a polishing step for performing polishing of the glass substrate with abrasive particles having a specified particle size, and
    a supersonic cleaning step for performing supersonic cleaning of the glass substrate after the polishing step,
    wherein the supersonic cleaning step comprises:
    performing a first supersonic cleaning at a frequency to aggregate particles having the specified particle size to form secondary particles, and then
    performing a second supersonic cleaning at a frequency to clean the secondary particles as a cleaning target.

2. The manufacturing method of a glass substrate for a magnetic disk according to claim 1, wherein the polishing step uses abrasive particles having a particle size of 10 nm to 30 nm,
    a first supersonic cleaning is performed at a frequency of 300 kHz to 1,000 kHz to form secondary particles, and then
    a second supersonic cleaning is performed at a frequency of 30 kHz to 100 kHz in the supersonic cleaning step.

3. The manufacturing method of a glass substrate for a magnetic disk according to claim 1, wherein the secondary particles having a particle size of 1,000 nm to 3,000 nm are formed by performing the first supersonic cleaning.

4. The manufacturing method of a glass substrate for a magnetic disk according to claim 1, wherein the polishing step is the final polishing step among polishing steps which are performed several times for the glass substrate.

5. A manufacturing method of a glass substrate for a magnetic disk comprising:
    a polishing treatment for performing polishing of the glass substrate surfaces with a slurry containing abrasive particles, and then
    a cleaning treatment for removing the abrasive particles,
    wherein the cleaning treatment comprises:
    performing an aggregation treatment for forming secondary particles by aggregating abrasive particles adhering to the glass substrate surfaces after the polishing step, and then
    removing the secondary particles by the cleaning treatment.

6. The manufacturing method of a glass substrate for a magnetic disk according to claim 5, wherein the abrasive particles comprise a silicon oxide.

7. The manufacturing method of a glass substrate for a magnetic disk according to claim 5, wherein the aggregation treatment generates secondary particles by applying a supersonic wave on the abrasive particles.

8. The manufacturing method of a glass substrate for a magnetic disk according to claim 5, wherein the aggregation treatment is a treatment for applying a supersonic wave on the abrasive particles in an alkaline adjusted liquid.

9. The manufacturing method of a glass substrate for a magnetic disk according to claim 5, wherein the slurry is an acidic adjusted slurry containing abrasive particles of silicon oxide.

10. The manufacturing method of a glass substrate for a magnetic disk according to claim 5, wherein the cleaning treatment is supersonic cleaning.

11. The manufacturing method of a glass substrate for a magnetic disk according to claim 2, wherein the secondary particles having a particle size of 1,000 nm to 3,000 nm are formed by performing the first supersonic cleaning.

12. The manufacturing method of a glass substrate for a magnetic disk according to claim 2, wherein the polishing step is the final polishing step among polishing steps which are performed several times for the glass substrate.

13. The manufacturing method of a glass substrate for a magnetic disk according to claim 11, wherein the polishing step is the final polishing step among polishing steps which are performed several times for the glass substrate.

14. The manufacturing method of a glass substrate for a magnetic disk according to claim 6, wherein the aggregation treatment generates secondary particles by applying a supersonic wave on the abrasive particles.

15. The manufacturing method of a glass substrate for a magnetic disk according to claim 6, wherein the aggregation treatment is a treatment for applying a supersonic wave on the abrasive particles in an alkaline adjusted liquid.

16. The manufacturing method of a glass substrate for a magnetic disk according to claim 7, wherein the aggregation treatment is a treatment for applying a supersonic wave on the abrasive particles in an alkaline adjusted liquid.

17. The manufacturing method of a glass substrate for a magnetic disk according to claim 14, wherein the aggregation treatment is a treatment for applying a supersonic wave on the abrasive particles in an alkaline adjusted liquid.

18. The manufacturing method of a glass substrate for a magnetic disk according to claim 6, wherein the slurry is an acidic adjusted slurry containing abrasive particles of silicon oxide.

19. The manufacturing method of a glass substrate for a magnetic disk according to claim 6, wherein the cleaning treatment is supersonic cleaning.

* * * * *